United States Patent
Rouzes (10) Patent No.: US 8,098,383 B2
(45) Date of Patent: Jan. 17, 2012

(54) METHOD FOR DETECTING THE SPACE ORIENTATION AND POSITION OF AN OBJECT

(75) Inventor: Siegfried Rouzes, Le Haillan (FR)

(73) Assignee: Thales (FR)

( * ) Notice: Subject to any disclaimer, the term of this patent is extended or adjusted under 35 U.S.C. 154(b) by 479 days.

(21) Appl. No.: 12/439,242

(22) PCT Filed: Aug. 31, 2007

(86) PCT No.: PCT/EP2007/059146
§ 371 (c)(1),
(2), (4) Date: Mar. 25, 2009

(87) PCT Pub. No.: WO2008/028877
PCT Pub. Date: Mar. 13, 2008

(65) Prior Publication Data
US 2010/0020335 A1   Jan. 28, 2010

(30) Foreign Application Priority Data

Sep. 5, 2006 (FR) ..................................... 06 07763

(51) Int. Cl.
*G01B 11/14* (2006.01)
(52) U.S. Cl. ........................................................ 356/614
(58) Field of Classification Search .................. None
See application file for complete search history.

(56) References Cited

U.S. PATENT DOCUMENTS

| | | | |
|---|---|---|---|
| 4,111,555 A | 9/1978 | Ellis | |
| 4,642,469 A | 2/1987 | Francis et al. | |

FOREIGN PATENT DOCUMENTS

| | | | |
|---|---|---|---|
| EP | 0480825 A2 | 4/1992 | |
| EP | 1600726 A2 | 11/2005 | |

*Primary Examiner* — Gregory J Toatley
*Assistant Examiner* — Amanda Merlino
(74) *Attorney, Agent, or Firm* — Lowe Hauptman Ham & Berner, LLP (57) ABSTRACT

The invention relates to a method for the optical detection of the position and orientation of an object by means of an optical device comprising at least one parallelogram fastened to said object, the optical device comprising optical means and electronic analysis means making it possible to determine the coordinates of the four vertices of the parallelogram A'B'C'D', in an orthonormal frame with center 0, denoted $R_0$ $(O, \vec{i}, \vec{j}, \vec{k})$. The principle of the device consists in determining the vertices of the parallelogram A'B'C'D', on the basis of the knowledge of the characteristics of the parallelogram and of four known points of a quadrilateral ABCD. This quadrilateral represents the drawing arising from the projection of the parallelogram A'B'C'D' in a known image plane. The characteristics A'B'C'D' of the parallelogram can be for example its height, its width and the coordinate of one of its points in the frame $R_0$.

14 Claims, 6 Drawing Sheets

METHOD FOR DETECTING THE SPACE ORIENTATION AND POSITION OF AN OBJECT

CROSS-REFERENCE TO RELATED APPLICATIONS

The present Application is based on International Application No. PCT/EP2007/059146, filed on Aug. 31, 2007, which in turn corresponds to French Application No. 0607763 filed on Sep. 5, 2006, and priority is hereby claimed under 35 USC §119 based on these applications. Each of these applications are hereby incorporated by reference in their entirety into the present application.

FIELD OF THE INVENTION

The present invention relates to a method for the optical detection of the position and orientation of an object in space. It applies more particularly in the aeronautical field. In this case, the object is a pilot's helmet comprising a helmet viewing system.

BACKGROUND OF THE INVENTION

The determination of the position and orientation of an object in space is a problem relating to numerous technical fields. The various solutions generally afforded must have the principal characteristics of resolving any ambiguity in position or orientation, of responding to more or less severe dynamics of the systems and of satisfying high accuracy.

These systems are used in aeronautics, for detecting head posture, notably for the helmets of fighter aircraft, of military, civilian or para-civilian helicopters. They are also used for detecting simulation helmets, this detection can then be combined with an oculometry device, also called an eyetracker, for detecting position of the gaze. Numerous applications of these systems also exist in the field of virtual reality and games.

Currently, optical systems for detecting posture rely on two main principles. Firstly, it is possible to identify on an image, produced by a matrix sensor for example, the position of luminous pointlike emitters. Electroluminescent diodes, also called LEDs, can be used as emitters. Additionally, another solution consists in observing an unambiguous pattern printed on the object whose position and orientation are to be determined. For this purpose, one or more cameras are used to observe this pattern and analyze it on the basis of the images collected.

In the case of the use of luminous sources of the LED type, the latter are disposed in groups. These groups of LEDs are also called clusters. In the case of aeronautical applications, these clusters, disposed on the helmet, are generally not contained in a plane, and in numerous cases take the form of a tetrahedron on the helmet.

Figure 1:
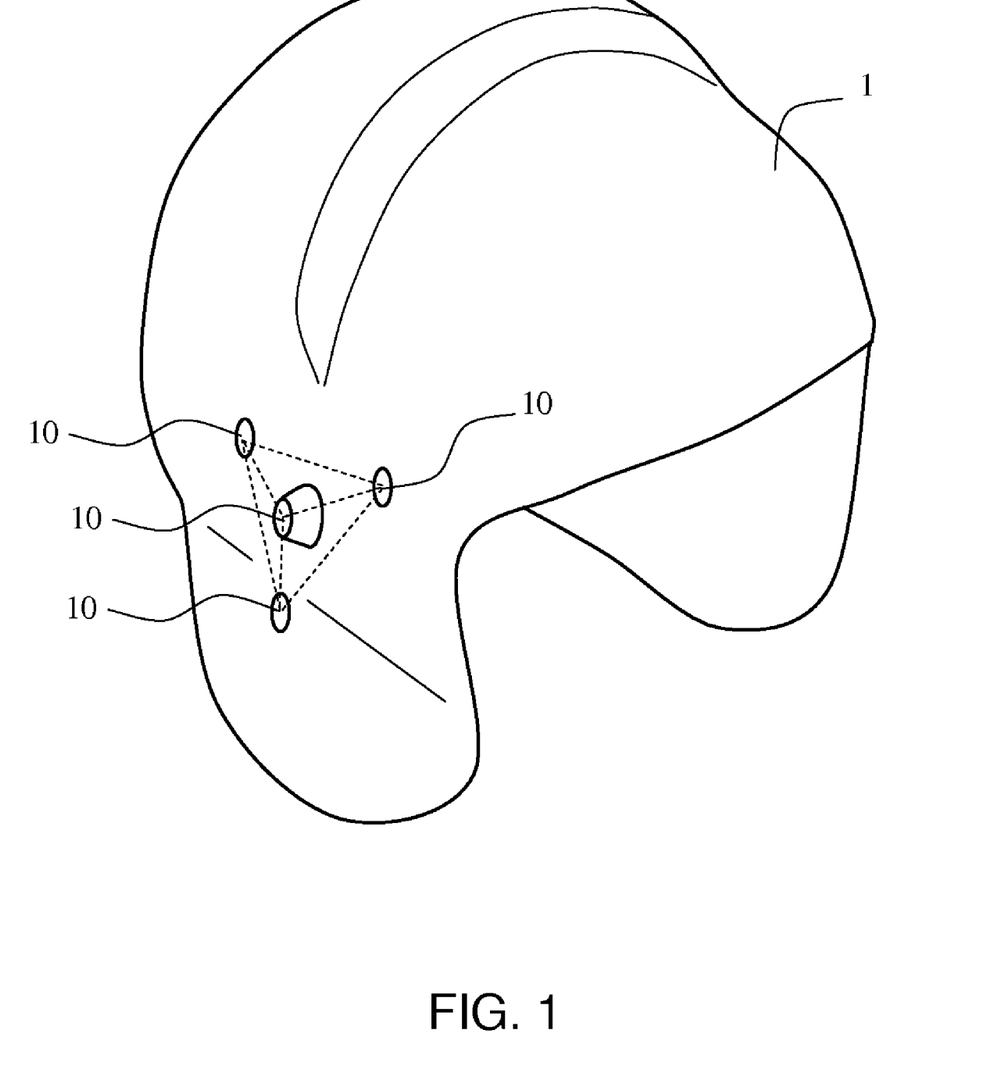
FIG. 1 represents a pilot's helmet according to the state of the art.

FIG. 1 represents a helmet 1 used in aeronautics for systems for detecting the position and orientation of objects in space. The diodes 10 placed on the helmet form a tetrahedron-shaped cluster. The tetrahedron is indicated by dashed lines in FIG. 1. This type of system requires sensors, generally cameras placed in the cockpit. This entails a multi-emitter/multi-receiver device whose emitters are the diodes and the receivers the cameras.

The analysis of the information arising from the sensors is complex, having regard to the spatial geometry which requires large computational capabilities. Additionally, the slaving of a system of this type may exhibit aspects that are limiting in terms of fastness of the computation time and may therefore affect the accuracy of the systems. To attain the required accuracy, the sensor, of camera type, must have a high resolution and the processing of the sensor information is subject to a prediction of the position of the LEDs and an analysis of zones of interest.

Variants of these systems exist, notably devices for detecting the shadow of a grid illuminated by a helmet-mounted source. These systems exhibit a limitation on the accurate determination of the orientation of the object to be identified.

The process of detecting the position and orientation of an object, through the observation of a pattern on said object by cameras, is less accurate. This process requires large computational capabilities and poses problems of use in disturbed environments. One way of improving the performance of such a system is to multiply the sensors and to place them in an optimal manner. This solution nevertheless remains difficult to implement.

In a general manner, the current solutions for detecting the position and orientation of an object in space, in the aeronautical field, exhibit limitations related to the compromise between the implementation of computationally extremely unwieldy solutions and the accuracy requirements demanded. Additionally, the constraints of the aeronautical environment necessitate a redundancy of the optical means or of the sensors and do not allow the implementation of simple technical solutions.

SUMMARY OF THE INVENTION

The method according to the invention makes it possible, notably, to alleviate the aforesaid drawbacks. Specifically, the device comprises sensors or emitters grouped into clusters having a parallelogram shape. The method for determining the position of the sensors is, therefore, simple to implement and requires very few computations, the method being deterministic. This method is very advantageous in the case of slaved systems where the times between two measurements are reduced and the accuracy of detection increased.

Advantageously, the method for the optical detection of the position and orientation of an object is carried out by means of an optical device comprising at least one first parallelogram (A'B'C'D') fastened to said object and comprising optical means and electronic analysis means making it possible to determine the coordinates of the four vertices of the first parallelogram (A'B'C'D'), in an orthonormal frame ($R_0$ (O, $\vec{i}$, $\vec{j}$, $\vec{k}$)), comprising a center (O), said frame comprising a plane (O, $\vec{j}$, $\vec{k}$) parallel to the image plane (Pi). The image plane is without ambiguity the image plane of the optical device considered.

The method comprises several steps:
 a first step of defining a second reference parallelogram ($A_0B_0C_0D_0$) whose center (O) is the center of the frame ($R_0$ (O, $\vec{i}$, $\vec{j}$, $\vec{k}$)), possessing the same characteristics as the first parallelogram (A'B'C'D'), situated in the plane (O, $\vec{j}$, $\vec{k}$) parallel to the image plane (Pi);
 a second step of defining the transformation under which the first parallelogram (A'B'C'D') is the image of the second parallelogram ($A_0B_0C_0D_0$), said transformation decomposing into a translation $\vec{u}$ and a vector rotation r.
 a third step of determining, through the optical means, a quadrilateral (ABCD), obtained by projecting the first parallelogram (A'B'C'D') into the image plane (Pi), with nonzero abscissa Xi, in the frame (R0) with center 0, along a direction ($\vec{i}$) perpendicular to the image plane (Pi), a fourth step of determining:
- a first point (E) belonging to the image plane (Pi), when it exists, such that the first point (E) is the intersection of the straight lines formed by two opposite sides of the quadrilateral (AB, CD);
- a second point (F) belonging to the image plane (Pi), when it exists, such that the second point (F) is the intersection of the straight lines formed by the other two sides of the quadrilateral (AC, BD),
- a first vector ($\overrightarrow{OE}$), connecting the center of the frame (O) and the first point (E);
- a second vector ($\overrightarrow{OF}$), connecting the center of the frame (O) and the second point (F);

a fifth step of determining the respective images of the unit vectors ($\vec{i}$, $\vec{j}$, $\vec{k}$), defining the frame ($R_0$), by the rotation r, as a function of the first and second vectors ($\overrightarrow{OE}$, $\overrightarrow{OF}$) and of the coordinates of the four vertices ($A_0,B_0,C_0,D_0$) of the second parallelogram ($A_0B_0C_0D_0$);

a sixth step of determining the translation $\vec{u}$ as a function of the first and second vectors ($\overrightarrow{OE}$, $\overrightarrow{OF}$) and of the coordinates of the four vertices ($A_0,B_0,C_0,D_0$) of the second parallelogram ($A_0B_0C_0D_0$). The knowledge of the translation $\vec{u}$ and of the rotation r suffices to pinpoint the position of the object, as well as its attitude in space.

finally, a seventh step may be carried out to determine the coordinates of the vertices of the first parallelogram (A',B',C',D') in $R_0$, on the basis of the known coordinates of the vertices of the second parallelogram ($A_0,B_0,C_0,D_0$) and of the transformation composed of a translation u and of a rotation r.

Advantageously, the detection method can comprise particular forms of parallelograms such as diamonds, rectangles or squares.

Advantageously, the optical detection method can comprise optical means comprising a holographic video-projector emitting, in an image, sharp luminous patterns at every point of the zone of sweep of said object and at least two identical and mutually parallel lineal matrix sensors, disposed on the object, the four ends of these two sensors forming a parallelogram.

Advantageously, the optical detection method can comprise optical means comprising a camera and at least four emitting diodes disposed on the object, each of which represents the ends of a parallelogram.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The optical detection method according to the invention consists in determining the vertices of a parallelogram A'B'C'D', situated in a frame $R_0$ of space, denoted $R_0$ (O, $\vec{i}$, $\vec{j}$, $\vec{k}$), on the basis of the knowledge of the characteristics of the parallelogram and of four known points of a quadrilateral ABCD. This quadrilateral represents a drawing arising from the projection of the parallelogram A'B'C'D' in an image plane.

The characteristics A'B'C'D' of the parallelogram may be for example its height, its width and the coordinate of one of its points in the frame $R_0$. Of course, any other mode of representation could be appropriate.

This detection of the parallelogram is done by means of an optical device making it possible, when the parallelogram is fixed to an object, to pinpoint the position and the orientation of the object in $R_0$.

Figure 2:
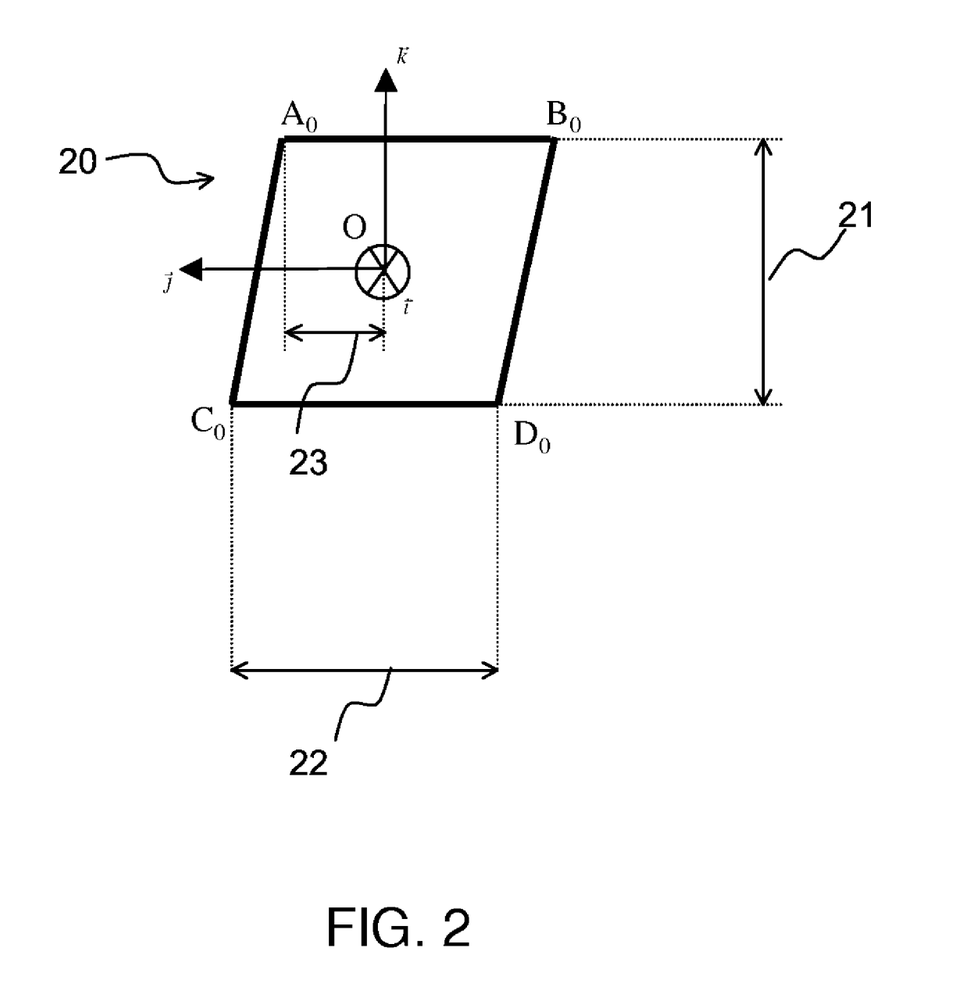
FIG. 2 represents the characteristics of a reference parallelogram.

FIG. 2 shows an example of a parallelogram 20 with vertices $A_0$, $B_0$, $C_0$ and $D_0$ and whose characteristics are the same as those of the parallelogram A'B'C'D' whose position and orientation in $R_0$ are to be determined. The parallelogram 20 possesses four sides denoted $A_0B_0$, $C_0D_0$, $A_0C_0$ and $B_0D_0$ that are pairwise mutually parallel. The height 21 of the parallelogram is denoted H, its width 22 is denoted L and the coordinate 23 of $A_0$ in the frame $R_0$ along $\vec{j}$ is denoted T.

The four points are defined in $R_0$ by the following equations:

$$\overrightarrow{OA_0} = T\vec{j} + \frac{H}{2}\vec{k},\ \overrightarrow{OB_0} = (T-L)\vec{j} + \frac{H}{2}\vec{k},\ \overrightarrow{OC_0} = -\overrightarrow{OB_0}\ \text{and}\ \overrightarrow{OD_0} = -\overrightarrow{OA_0}.$$

Figure 3:
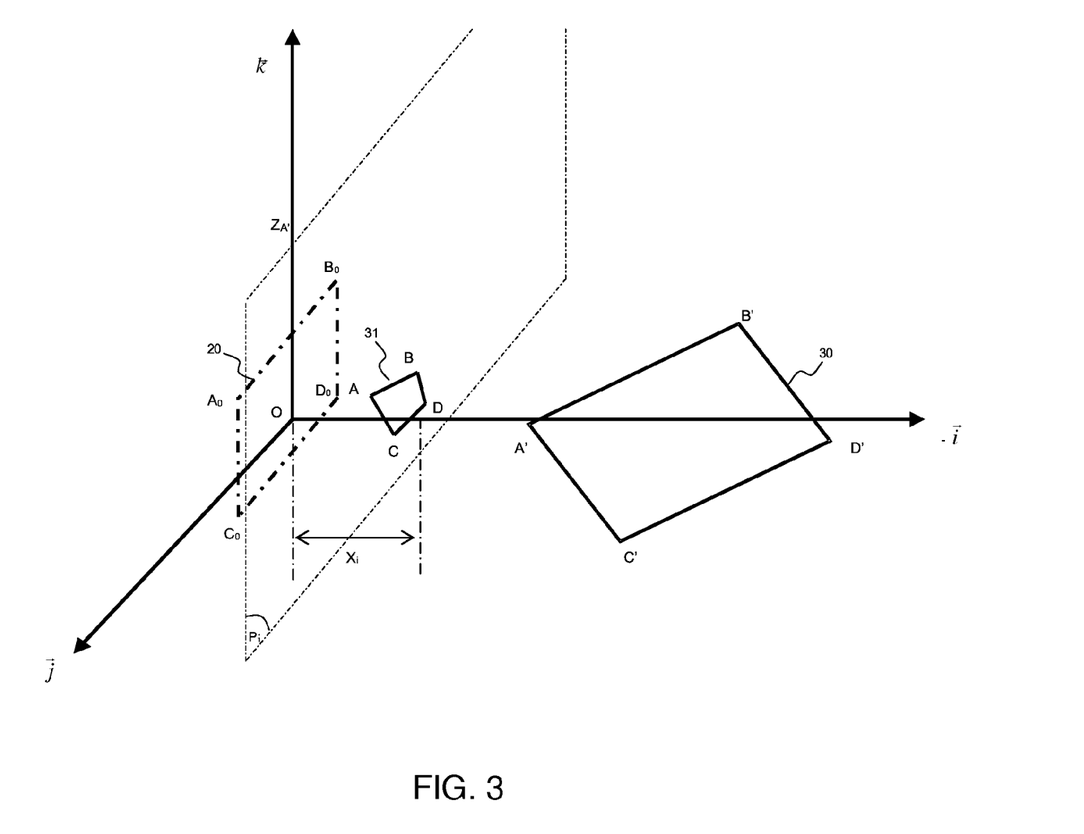
FIG. 3 represents a 3D view of the drawing of a parallelogram arising from its projection in an image plane.

As indicated in FIG. 3, this reference parallelogram is placed in the frame $R_0$, in such a manner that its center is O. The plane (O, $\vec{j}$, $\vec{k}$) denoted $P_0$ is parallel to the plane $P_i$ denoted ($X_i$, $\vec{j}$, $\vec{k}$), the latter being the image plane. The plane $P_i$ contains the drawing ABCD of the quadrilateral where $X_i$ is the abscissa of the plane along the axis $\vec{i}$.

It is equivalent to know the coordinates of the four vertices of the parallelogram A'B'C'D' in $R_0$ as to know the analytical transformation which makes it possible to deduce A'B'C'D' from the parallelogram 20.

Given that the two parallelograms have the same characteristics, there exists a direct vector rotation r in relation to an axis passing through O and a translation $\vec{u}$, r and $\vec{u}$ being unique, such that, $$\overrightarrow{OA'} = \vec{u} + r(\overrightarrow{OA_0})$$

$$\overrightarrow{OB'} = \vec{u} + r(\overrightarrow{OB_0})$$

$$\overrightarrow{OC'} = \vec{u} + r(\overrightarrow{OC_0})$$

$$\overrightarrow{OD'} = \vec{u} + r(\overrightarrow{OD_0})$$

FIG. 3 represents the parallelogram 30 denoted A'B'C'D', in the frame $R_0$. Its drawing 31, arising from the projection of A'B'C'D' in the plane $P_i$ is represented by the quadrilateral ABCD.

The coordinates of the quadrilateral ABCD in $R_0$ being known through the optical detection method, the algorithm makes it possible on the basis of the drawing 31 and of the reference parallelogram 20, to ascertain the transformations r and $\vec{u}$. The position and attitude of the object can be deduced from r and $\vec{u}$ directly, without specifically knowing the positions of the vertices of the parallelogram A'B'C'D'.

Figure 4:
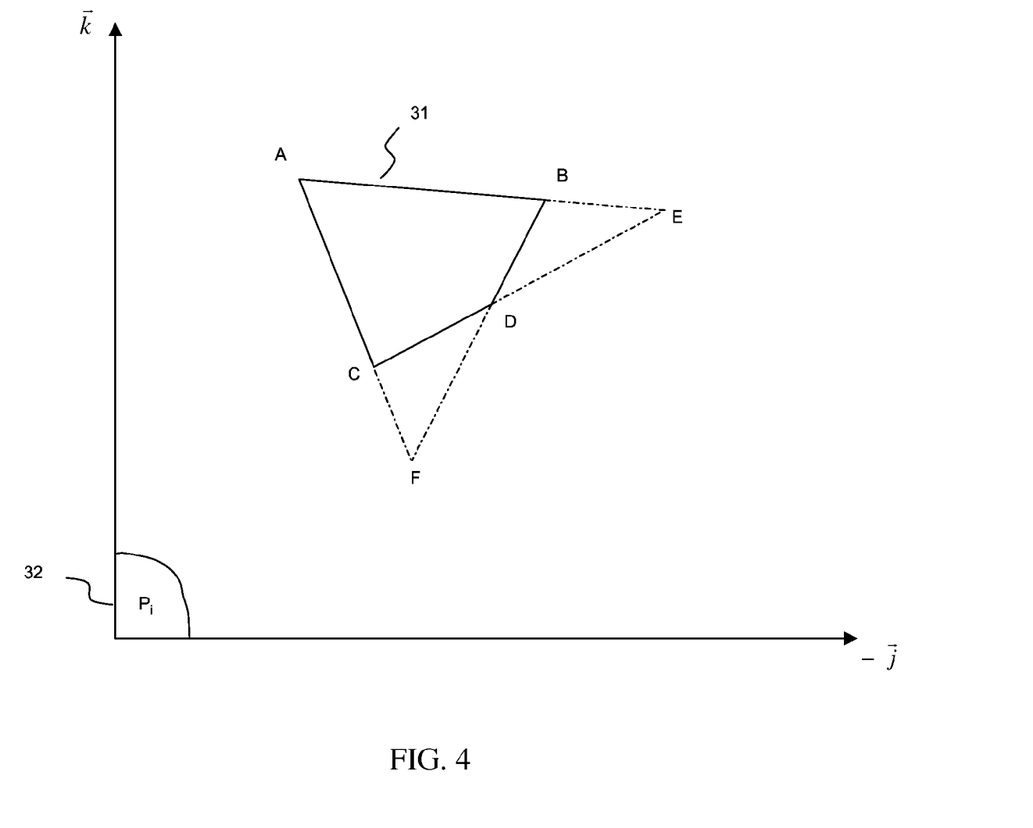
FIG. 4 represents the vanishing points of the drawing of FIG. 3, when they exist.

FIG. 4 represents in the plane $P_i$, the quadrilateral ABCD. When they exist, this corresponding to the most frequent case, the coordinates of the points of intersection of the straight lines (AB) and (CD) and of the straight lines (AD) and (BC) are determined by knowing the coordinates of the points A, B, C, D in $R_0$. The point of intersection of the straight lines (AB) and (CD) is then denoted E and the point of intersection of the straight lines (AD) and (BC) is denoted F. In this case, the vector $\overrightarrow{OE}$ is denoted $\vec{e}$ and the vector $\overrightarrow{OF}$ is denoted $\vec{f}$.

It is known that the vector $\vec{e}$ is positively proportional to $\overrightarrow{A'B'}$ and that the vector $\vec{f}$ is positively proportional to $\overrightarrow{A'C'}$ in $R_0$.

Figure 5:
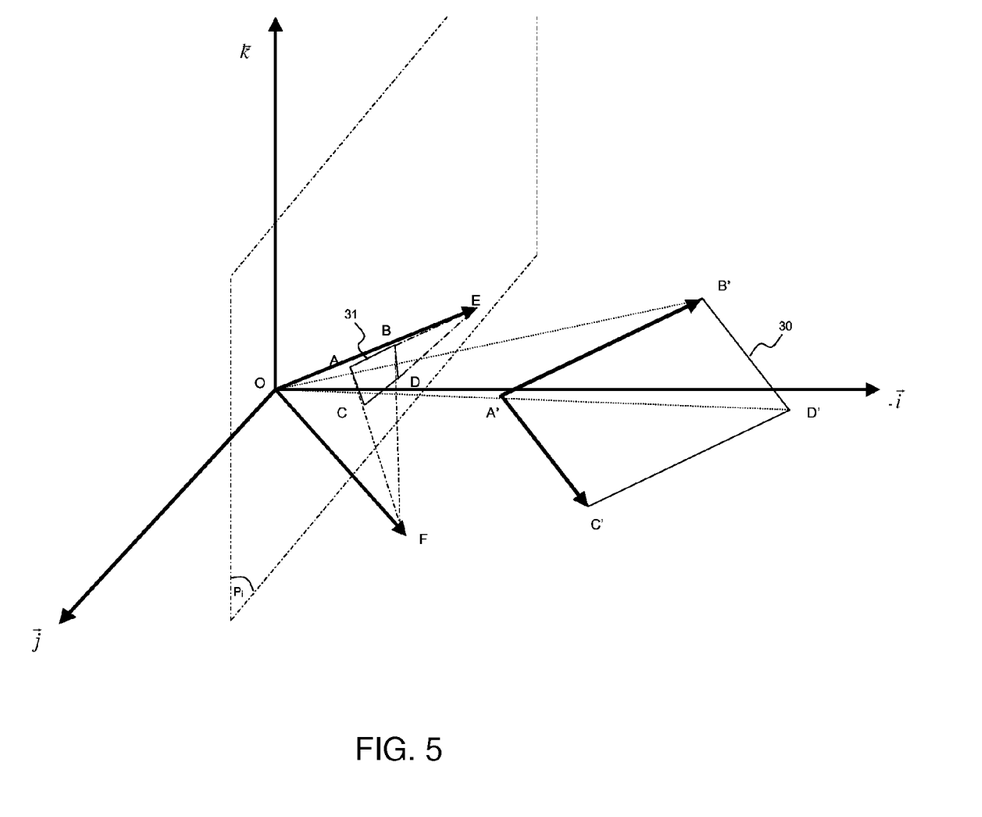
FIG. 5 represents the vectors, known in $R_0$, of the vanishing points of the drawing of FIG. 3.

FIG. 5 represents when they exist, the vectors $\overrightarrow{OE}$ and $\overrightarrow{OF}$ in the frame $R_0$ and illustrates the aforesaid property.

The cases, where E does not exist or F does not exist or E and F do not exist, correspond, respectively, to the following relations, which ensue from the geometry of the quadrilateral ABCD:

the sides AB and CD are parallel. ABCD is a trapezium in relation to AB, that is to say the side A'B' is parallel to the image plane and the side A'C' is not. We determine $\vec{e} = \overrightarrow{AB}$ and $\vec{f} = \overrightarrow{OF}$.

the sides BC and AD are parallel, ABCD is a trapezium in relation to BC, that is to say the side A'C' is parallel to the image plane and the side A'B' is not; We determine $\vec{f} = \overrightarrow{AC}$ and $\vec{e} = \overrightarrow{OE}$.

ABCD is a parallelogram, that is to say the parallelogram A'B'C'D' is parallel to the image plane. We have the following two relations: $\vec{e} = \overrightarrow{AB}$ and $\vec{f} = \overrightarrow{AC}$.

The following computations are carried out in the case where E and F exist, the simplifications being made naturally for the particular cases where a determined solution exists for each case.

From $\overrightarrow{A'B'} = r(\overrightarrow{A_0B_0})$, we obtain, with the previous notation: $\overrightarrow{A'B'} = -L \cdot r(\vec{j})$, we deduce that $$r(\vec{j}) = -\frac{\vec{e}}{\|\vec{e}\|},$$

given that $\|\vec{j}\| = 1 \Rightarrow \|r(\vec{j})\| = 1$.

Likewise, from $\overrightarrow{A'C'} = r(\overrightarrow{A_0C_0})$, we obtain, with the previous notation: $\overrightarrow{A'C'} = (L-2T) \cdot r(\vec{j}) - H r(\vec{k})$, We deduce that:

$$r(\vec{k}) = \frac{q}{H} r(\vec{j}) - \frac{\sqrt{q^2 + H^2}}{H} \frac{\vec{f}}{\|\vec{f}\|},$$

where q=L−2T.

r being a direct rotation, we obtain: $r(\vec{i}) = r(\vec{j}) \wedge r(\vec{k})$.

The three respective images of $\vec{i}, \vec{j}, \vec{k}$ under the rotation r are determined as a function of the known characteristics of the parallelogram and of the two vectors $\vec{e}$ and $\vec{f}$.

From $\overrightarrow{OA'} = \vec{u} + r(\overrightarrow{OA_0})$, we derive $$\vec{u} = \overrightarrow{OA'} - T \cdot r(\vec{j}) - \frac{H}{2} \cdot r(\vec{k}).$$

If $\mu_E$ denotes the known real such that $\overrightarrow{AE} = \mu_E \overrightarrow{AB}$ and k denotes the real such that $\overrightarrow{OA'} = k \cdot \overrightarrow{OA}$, it then follows that:

$$k = \frac{A'B'}{OE} \cdot |\mu_E - 1|.$$

In the same manner we have $\mu_F$ the real defined by the relation $\overrightarrow{AF} = \mu_F \overrightarrow{AC}$.

The analytical result for the sought-after translation is obtained:

$$\vec{u} = k \cdot \overrightarrow{OA} - T \cdot r(\vec{j}) - \frac{H}{2} \cdot r(\vec{k}),$$

with k known.

The parallelogram A'B'C'D' is deduced by determining the transformation composed of a known vector rotation and of a known translation, of the reference parallelogram $A_0B_0C_0D_0$.

In the case where A'B'C'D' is a diamond we have additional relation: $|1-\mu_E| \cdot OF = |1-\mu_F| \cdot OE$.

In the case where A'B'C'D' is a rectangle we have additional relation: $(\overrightarrow{OE} \cdot \overrightarrow{OF}) = 0$.

In the case where A'B'C'D' is a square, the analytical expressions for the transformations of $\vec{i}, \vec{j}, \vec{k}$ under the rotation r are simplified. We obtain: L=H=2×T and the rotation of the vector $\vec{k}$ is determined in a simple manner:

$$r(\vec{k}) = -\frac{\vec{f}}{\|\vec{f}\|}.$$

The two additional relations, corresponding to the case of the diamond and of the rectangle, are both valid for the case of the square.

Figure 6:
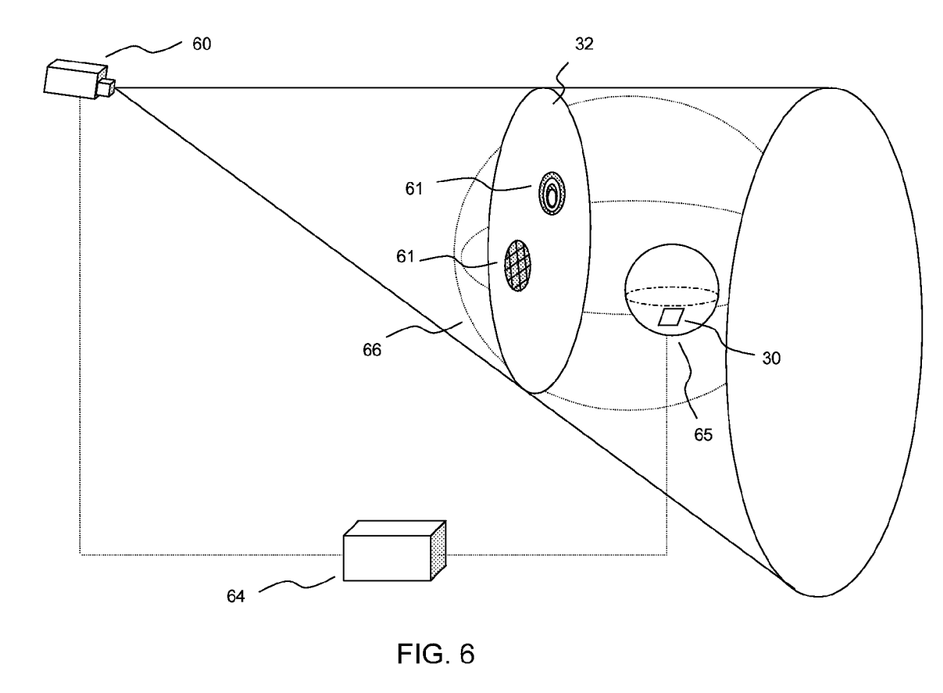
FIG. 6 represents an exemplary optical device according to the invention.

FIG. 6 is an exemplary device, according to the invention. An object 65 comprising electro-optical receivers, of lineal matrix sensor type and a means for projecting images, said images comprising luminous patterns 61.

The sensors are grouped together in such a manner that pairwise they form parallelograms 30. The sensors are pairwise mutually parallel and of equal size.

Additionally, an exemplary means for projecting images, according to the invention, is to use an optical means emitting, at every point of the zone of sweep 66 of the object 65, a sharp image. The sensors placed on the helmet receive unambiguous signals originating from this image.

For this purpose, an exemplary embodiment of the invention uses a holographic video-projector 60 as projection means. Holographic video-projectors such as these are produced and marketed by the company Light Blue Optics and are known under the brand PVPro. This holographic video-projector possesses the advantageous property of emitting a sharp image at every point of the zone of sweep 66.

This holographic video-projector, called VPH hereinafter, comprises a coherent light source, which is generally a laser diode, a display making it possible to produce a phase image, optical means arranged so as to create on the basis of the wave emitted by the light source, a first reference wave and a second wave modulated by the display and means allowing these two waves to be made to interfere. The final image obtained is a Fraunhofer hologram of the phase image generated on the display. It is possible to generate any type of image by this means. The display may be a liquid crystal display, of LCOS type for example.

Under these conditions, the center O of the frame $R_0$ is defined by a point of the VPH, and the plane $(O, \vec{j}, \vec{k})$ is the image plane parallel to the image plane 32 of the projected image comprising the origin.

So as to pinpoint the object in space, the VPH emits images comprising luminous patterns 61 on the sensors situated on the helmet. The analysis of the information arising from the sensors is carried out by a digital computer 64, placed downstream of the sensors, in the processing chain for treating the signals received.

The analysis of the signals received by each cell makes it possible to reconstitute the drawing, obtained by projection of the parallelogram positioned on the object in the image plane. The drawing is determined, in an almost natural manner, by photographing the patterns deformed in the local plane of the parallelogram. Knowing the original patterns and their deformations identified by the sensors, the a priori knowledge of the characteristics of the parallelogram give us its drawing inversely. The latter represents a quadrilateral in the image plane.

On the basis of this drawing, and of the knowledge of the characteristics of the parallelogram, a priori known, the method makes it possible to retrieve in a simple manner the position and orientation of the cluster in the frame $R_0$.

A second variant embodiment is to consider an optical device comprising at least one camera and a pilot's helmet comprising emitting diodes grouped into clusters At least one cluster forms a parallelogram A'B'C'D', whose vertices are diodes.

Under these conditions, the zone of sweep is all or part of the cockpit.

The center of the frame $R_0$ is the camera, the plane $(O, \vec{j}, \vec{k})$ is the image plane of the camera. The camera then obtains, in its image plane, the representation of the quadrilateral ABCD arising from the projection of the parallelogram A'B'C'D' in the image plane.

The analysis means can therefore retrieve the position and orientation of the cluster on the basis of the knowledge of the representation of the quadrilateral in a known image plane and of the a priori known characteristics of the parallelogram.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for the optical detection of the position and orientation of an object by means of an optical device comprising at least one first parallelogram (A'B'C'D') fastened to the object, whose characteristics are known, and having optical means and electronic analysis means to determine the coordinates of the four vertices of the first parallelogram (A'B'C'D'), in an orthonormal frame ($R_0$ (O, $\vec{i}, \vec{j}, \vec{k}$)), having a center (O), said frame comprising a plane (O, $\vec{j}, \vec{k}$) parallel to an image plane (Pi), said method comprising:
   a first step of defining a second reference parallelogram ($A_0B_0C_0D_0$) whose center (O) is the center of the frame ($R_0$ (O, $\vec{i}, \vec{j}, \vec{k}$)), possessing the same characteristics as the first parallelogram (A'B'C'D'), situated in the plane (O, $\vec{j}, \vec{k}$) parallel to the image plane (Pi);
   a second step of defining a transformation under which the first parallelogram (A'B'C'D') is the image of the second parallelogram ($A_0B_0C_0D_0$), said transformation decomposing into a translation $\vec{u}$ and a vector rotation r.
   a third step of determining, through the optical means, a quadrilateral (ABCD), obtained by projecting the first parallelogram (A'B'C'D') into the image plane (Pi), with nonzero abscissa Xi, in the frame ($R_0$) with center O, along a direction ($\vec{i}$) perpendicular to the image plane (Pi),
   a fourth step of determining:
      a first point (E) belonging to the image plane (Pi), when it exists, such that the first point (E) is the intersection of the straight lines formed by two opposite sides of the quadrilateral (AB, CD);
      a second point (F) belonging to the image plane (Pi), when it exists, such that the second point (F) is the intersection of the straight lines formed by the other two sides of the quadrilateral (AC,BD),
      a first vector ($\overrightarrow{OE}$), connecting the center of the frame (O) and the first point (E);

a second vector $(\overrightarrow{OF})$, connecting the center of the frame (O) and the second point (F);

a fifth step of determining the respective images of the unit vectors $(\vec{i}, \vec{j}, \vec{k})$, defining the frame $(R_0)$, by a rotation (r) of the transformation, as a function of the first and second vectors $(\overrightarrow{OE}, \overrightarrow{OF})$ and of the known characteristics of the second parallelogram $(A_0B_0C_0D_0)$;

a sixth step of determining a translation $(\vec{u})$ of the transformation as a function of the first and second vectors $(\overrightarrow{OE}, \overrightarrow{OF})$, of the vector connecting the center of the frame (O) to a vertex of the quadrilateral (ABCD) and of the known characteristics of the second parallelogram $(A_0B_0C_0D_0)$.

2. The detection method as claimed in claim 1, comprising a seventh step of determining the coordinates of the vertices (A', B', C', D') of the first parallelogram in the frame $(R_0)$, as a function of the known coordinates of the vertices of the second parallelogram $(A_0B_0C_0D_0)$ and of the transformation composed of the translation $(\vec{u})$ and of the rotation (r).

3. The detection method as claimed in claim 1, wherein at least one of the parallelogram is a diamond.

4. The detection method as claimed in claim 1, wherein at least one of the parallelogram is a rectangle.

5. The detection method as claimed in claim 1, wherein at least one of the parallelogram is a square.

6. The method of optical detection as claimed in claim 1, wherein the device comprises optical means comprising a holographic video-projector emitting in the image plane sharp luminous patterns at every point of the zone of sweep corresponding to the space in which the object may move and at least two identical and mutually parallel lineal matrix sensors, disposed on the object, the four ends of these two sensors forming a parallelogram.

7. The method of optical detection as claimed in claim 1, wherein the device comprises optical means comprising a camera and at least four emitting diodes disposed on the object, each of which represents the ends of a parallelogram.

8. The detection method as claimed in claim 1, wherein the object is a pilot's helmet, the whole of the optical device being installed in an aircraft cockpit.

9. The method of optical detection as claimed in claim 2, wherein the device comprises optical means comprising a holographic video-projector emitting in the image plane sharp luminous patterns at every point of the zone of sweep corresponding to the space in which the object may move and at least two identical and mutually parallel lineal matrix sensors, disposed on the object, the four ends of these two sensors forming a parallelogram.

10. The method of optical detection as claimed in claim 2, wherein the device comprises optical means comprising a camera and at least four emitting diodes disposed on the object, each of which represents the ends of a parallelogram.

11. The detection method as claimed in claim 2, wherein the object is a pilot's helmet, the whole of the optical device being installed in an aircraft cockpit.

12. The detection method as claimed in claim 3, wherein the object is a pilot's helmet, the whole of the optical device being installed in an aircraft cockpit.

13. The detection method as claimed in claim 4, wherein the object is a pilot's helmet, the whole of the optical device being installed in an aircraft cockpit.

14. The detection method as claimed in claim 5, wherein the object is a pilot's helmet, the whole of the optical device being installed in an aircraft cockpit.

* * * * *